Oct. 9, 1928.
A. S. NELSON
PLOW
Filed Aug. 9, 1926
1,686,874
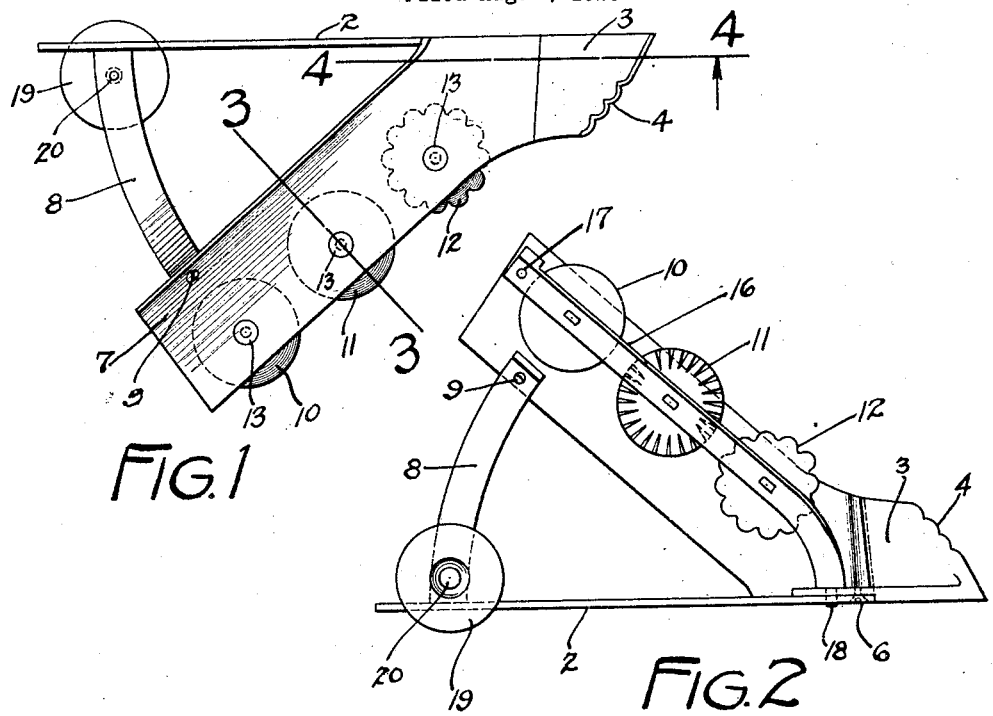
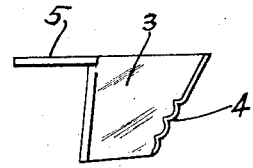
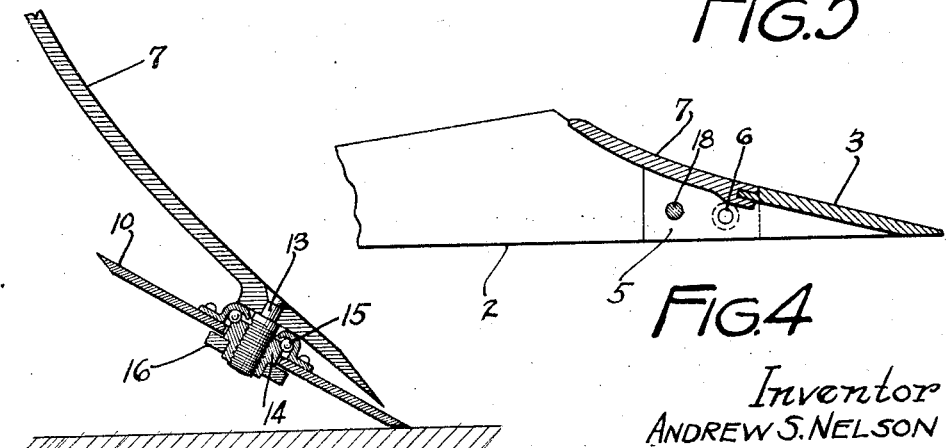
Inventor
ANDREW S. NELSON
ATTORNEYS Patented Oct. 9, 1928.

1,686,874

UNITED STATES PATENT OFFICE.

ANDREW S. NELSON, OF MAPLE PLAIN, MINNESOTA.

PLOW.

Application filed August 9, 1926. Serial No. 128,177.

The object of my invention is to provide means in connection with the landside and moldboard of a plow for cutting roots such as alfalfa which interfere seriously with the ordinary operation of plows; these roots being very tough and tenacious, so much so that the edge of the moldboard or the point of the plow are generally unequal to the task of severing them. The result is, the movement of the plow is stopped or it is thrust out of the soil.

The invention consists generally in various constructions and combinations all as hereinafter described and particularly pointed out in the claims.

In the accompanying drawings forming part of this specification,

Figure 1 is a plan view of a plow embodying my invention;

Figure 2 is a corresponding view of the under side of the plow;

Figure 3 is a sectional view on the line 3—3 of Figure 1;

Figure 4 is a sectional view on the line 4—4 of Figure 1;

Figure 5 is a detail view of the plow point.

In the drawing, 2 represents the landside of the plow, 3 the point having preferably a scalloped edge 4 and an extension 5 at its rear edge that is secured at 6 to the forward end of the landside. 7 represents the moldboard of the plow forming a continuation of the point 3 and having one end flush with the face of the landside. A bar 8 is connected to the landside and extension under the moldboard and is secured thereto at 9, thus bracing and supporting the end of the moldboard. On the under side of the moldboard I provide a series of cutting disks 10, 11 and 12. The disk 10 has preferably a smooth cutting peripheral edge. The disk 11 is preferably fluted at the edge and the disk 12 is scalloped as shown. These disks are all in substantial alignment and project a suitable distance beyond the edge of the moldboard. Threaded studs 13 are mounted in the moldboard and bushings 14 are interiorly threaded to fit said studs and have ball bearings 15 on the moldboard. A bar 16 has openings therein to receive the bushings and the threaded studs and has one end secured at 17 to the moldboard and its other end is provided with a stud 18 that fits a socket in the plow point and the landside. When this bar is removed, access may be had to the disks for removal or repairs. The disks are all jointly supported by means of the bar 16 but when this bar is removed any one of the disks may be removed from the moldboard independently of all the others. When the moldboard enters the soil, the disks supported at an angle to the ground line as indicated by Figure 3, will have their cutting edges in position to sever tough, tenacious roots such as alfalfa which will ordinarily interfere seriously with the plowing operation, these disks having cutting edges of different shape will adapt themselves to different conditions and should one root escape the cutting edge of one disk, it is almost sure to be engaged and severed by one of the succeeding disks, thus practically all of the roots that would interfere with the operation of the plow will be severed by these disks as the plow is drawn through the soil.

I prefer also to provide a disk 19 mounted on a stud 20 in the bar 8 adjacent the landside and projecting under the landside into the wall of the furrow a sufficient distance to sever any roots that may be embedded therein, thus cooperating with the disks on the moldboard for clearing the soil of alfalfa and other roots and materially adding in the speed and efficiency of the plowing operation.

The disks may, of course, be made in various sizes and shapes and in various ways, the details of construction herein shown and described, may be modified and still be within the scope of my invention.

I claim as my invention:

1. The combination with a plow moldboard, of a disk mounted on the under side thereof rearwardly of the point of the plow, and secured directly and only to the moldboard, and having a peripheral edge adapted to sever alfalfa and other roots and projecting beyond the edge of the moldboard, the rotative plane of the disk being at an angle to the horizontal.

2. The combination with a plow moldboard, of a plurality of disks mounted on the under side thereof, and having their cutting edges projecting beyond the edge of the moldboard, the rotative planes of the disks being at an angle to the horizontal.

3. The combination with a plow moldboard, of a plurality of disks rotatably mounted on the under side thereof, and having their cutting edges projecting beyond the edge of the moldboard, some of said disks having smooth cutting edges and others thereof being corrugated and scalloped.

4. The combination with a moldboard, and landside, of a bar having one end mounted in the landside and its other end secured to said moldboard, a comparatively narrow space being provided between said bar and the under side of the moldboard and a series of disks having cutting edges mounted in said bar and moldboard and projecting beyond the edge of the moldboard, the rotative planes of the disks being substantially parallel with the slanting surface of the mold board.

5. The combination with a plow moldboard, of a disk mounted on the under side of the moldboard and having an anti-friction bearing thereon and provided with a beveled cutting edge projecting beyond the edge of the moldboard and in a plane at an angle to the bottom of the furrow.

6. In combination with a plow mold board of a stud projecting from the inner side thereof, of a cutter disk having a bearing in threaded engagement with the stud, and a bar secured to the mold board and having an opening engaging the bearing, in a manner to prevent rotation of the bearing on the stud, said disk having its periphery extending beyond the mold board.

7. In combination with a plow mold board of a stud projecting from the inner side thereof, of a cutter disk having a bearing in threaded engagement with the stud, and a bar secured to the mold board and engaging the bearing to prevent rotation thereof on the stud, said disk having its periphery extending beyond the mold board.

8. In combination with a plow mold board of a stud projecting from the inner side thereof, of a cutter disk having a bearing in threaded engagement with the stud and a bar secured to the mold board and engaging the bearing to prevent rotation of the bearing on the stud, said disk having its periphery extending beyond the mold board, and the rotative plane of the disk being at an angle to the horizontal.

9. In combination with a plow mold board of a series of spaced studs projecting from the inner side thereof of a series of cutter disks one for each stud having a bearing in threaded engagement with the stud and a bar secured to the mold board and engaging all bearings to prevent rotation thereof on the studs, said disks having their peripheries extending beyond the mold board.

10. In combination with a plow having a moldboard and a landside, a point fitted to the forward end of the moldboard and having an extension engaging and connected to the landside by a single fastening device, a cutter disk rotatably mounted upon the moldboard and having an edge projecting beyond the forward edge of said moldboard and a bar securing the disk in operative position, and connected with the moldboard at one point, and having a portion traversing the plow point extension and landside, and acting to prevent movement of the point about the single fastening device which secures it in operative position.

In witness whereof, I have hereunto set my hand this 5th day of August, 1926.

ANDREW S. NELSON.